United States Patent [19]

Fukuyama et al.

[11] 4,102,944

[45] Jul. 25, 1978

[54] LOW PROFILE UNSATURATED POLYESTER RESIN COMPOSITION

[75] Inventors: Yoshiya Fukuyama, Hirakata; Katsuo Akagane; Takao Miwa, both of Ashiya, all of Japan

[73] Assignee: Sumitomo Chemical Company, Limited, Osaka, Japan

[21] Appl. No.: 723,934

[22] Filed: Sep. 16, 1976

[30] Foreign Application Priority Data

Sep. 25, 1975 [JP] Japan .............................. 50/116070

[51] Int. Cl.² .............................................. C08L 67/06
[52] U.S. Cl. ................................. 260/861; 260/40 R; 260/42.18; 260/42.52; 260/860; 528/273; 528/361; 528/366
[58] Field of Search ................ 260/861, 873, 835, 836

[56] References Cited

U.S. PATENT DOCUMENTS

| | | |
|---|---|---|
| 2,988,524 | 6/1961 | Fitch ........................ 260/16 |
| 3,644,568 | 2/1972 | Tilley et al. ................ 260/873 X |
| 3,736,278 | 5/1973 | Wada et al. ................ 260/861 X |
| 3,804,921 | 4/1974 | Jamison ..................... 260/861 |
| 3,923,927 | 12/1975 | Miyake et al. ............. 260/861 |
| 3,962,368 | 6/1976 | Herwig et al. ............. 260/873 X |
| 3,989,767 | 11/1976 | Homma et al. ............ 260/861 X |

*Primary Examiner*—Thomas De Benedictis, Sr.
*Attorney, Agent, or Firm*—Wenderoth, Lind & Ponack

[57] ABSTRACT

A low profile unsaturated polyester resin composition comprising (A) a reaction product between (1) a saturated polyester having a molecular weight of 3,000 – 50,000 obtained from a saturated polycarboxylic acid and a polyhydric alcohol and (2) an unsaturated monoglycidyl compounds, (B) an unsaturated polyester, and (C) an unsaturated monomer copolymerizable with the reaction product (A) and the unsaturated polyester (B) which gives a molded articles of improved surface smoothness and dimensional stability without deterioration of strength peculiar to unsaturated polyester resins.

13 Claims, No Drawings

LOW PROFILE UNSATURATED POLYESTER RESIN COMPOSITION

The present invention relates to low shrinking (low profile) unsaturated polyester resin compositions which give molded articles improved in surface smoothness and dimensional stability without deterioration of the strength peculiar to unsaturated polyester resins.

In general, unsaturated polyester resins are produced by reacting an unsaturated dibasic acid such as maleic anhydride, fumaric acid, itaconic acid, etc. or a mixture thereof with a saturated dibasic acid such as phthalic acid, isophthalic acid, adipic acid, etc. with a polyhydric alcohol such as ethylene glycol, propylene glycol, diethylene glycol, etc. and then adding a polymerizable unsaturated monomer such as styrene, vinyltoluene, etc. These unsaturated polyester resins can be polymerized and cured in the presence of a polymerization catalyst such as an organic peroxide.

Such unsaturated polyester resins incorporated with a reinforcing material such as glass fibers, have been widely used as electric parts, industrial art products, furnitures, tanks, pipes, etc. Especially, in 1,3-butylene years, they have also bisphenol A as the resin component of resin concrete or resin mortar — a structural material taking the place of cement concrete or cement mortar — which is mixed with sand, gravel, light weight aggregate, inorganic mineral powder, etc.

However, unsaturated polyester resins have a serious defect that the shrinkage upon curing is high. This defect is the cause of, for example, cracks, bends, undulations, migration of fillers (glass fibers, etc.), etc. which may be called fatal faults for molded products. Also, because of such shrinkage upon curing, it is impossible to produce molded products for which dimensional precision is necessarily required.

To overcome these defects, addition of a thermoplastic vinyl polymer or saturated polyester to the unsaturated polyester resins is generally employed, but in this method, the added resin does not participate in the cross-linking reaction upon curing and thus such added resin is present separately in the molded product. Therefore, strength of the molded product inevitably decreases, and also there is a defect that the added resin migrates to the surface to impair the surface condition and luster.

Thus, unsaturated polyester resins involve a contradiction between the lowering of shrinkage and prevention of a decrease in strength. Solution of this problem, namely imparting low shrinkage to the molded product without accompanying decrease in strength, is a great subject of interest in the field of unsaturated polyester resins. Thus, development of unsaturated polyester resins improved in the shrinkage without decrease in the strength has been strongly desired.

So far, a modified unsaturated polyester resin composition (unexamined Japanese Patent Publication No. 51188/1975) and another type of modified unsaturated polyester resin composition (unexamined Japanese Patent Publication No. 116189/1974) have been proposed. The former is obtained by blending an unsaturated polyester alkyl (which is a reaction product of a mixture of 10 mol % or less of an unsaturated dicarboxylic acid and 90 mol % or more of a saturated dicarboxylic acid with a glycol) with a liquid unsaturated polyester resin composition (which is a reaction product of a mixture of 50 mol % or more of an unsaturated dicarboxylic acid and 50 mol % or less of a saturated dicarboxylic acid with a glycol, to which reaction product a vinyl monomer is added); and the latter consists of two kinds of unsaturated polyester resins exhibiting different polymerization behaviors, one forming the disperse phase and the other the continuous phase, with the ratio of the molecular weight per reactive double bond of the former to that of the latter being 3 – 300. In these resin compositions, there are still problems in physical properties such as shrinkage and strength of the finally obtained cured product, and they do not necessarily satisfy all of these requirements.

In the light of such a situation, the present inventors have studied intensively in order to find an unsaturated polyester resin which gives a curved product sufficiently low in shrinkage without decrease in strength. As a result, the inventors have found that, by using a reaction product of a saturated polyester with an unsaturated monoglycidyl compound together with an unsaturated polyester, a very excellent effect for the above-mentioned objects can be obtained.

Thus the present invention provides a low shrinking (low profile) unsaturated polyester resin composition comprising (A) a reaction product between (1) a saturated polyester having a molecular weight of 3,000 – 50,000 obtained from a saturated polycarboxylic acid and a polyhydric alcohol and (2) an unsaturated monoglycidyl compound, (B) an unsaturated polyester and (C) an unsaturated monomer copolymerizable with (A) and (B).

By using the unsaturated polyester resin compositions of the present invention, the low profile can be attained due to the high molecular weight of saturated polyester residue, and a decrease in strength can be prevented by the terminal unsaturated bonds. On the other hand, when such unsaturated bonds are incorporated into the main chain of the saturated polyester as in the conventional compositions, that is to say, in the case of an unsaturated polyester of a low degree of unsaturation obtained using an unsaturated dicarboxylic acid, it is hardly possible to sufficiently improve the shrinkage without decrease in strength (refer to reference Example 1 described hereunder).

The saturated polyesters used in the present invention are obtained by reacting a saturated polycarboxylic acid such as isophthalic acid, phthalic anhydride, terephthalic acid, succinic acid, adipic acid, sebacic acid, etc. with a polyhydric alcohol such as ethylene glycol, diethylene glycol, triethylene glycol, propylene glycol, dipropylene glycol, 1,3-butylene glycol, neopentyl glycol, hydrogenated bisphenol A, bisphenol A propylene oxide addition products, etc. The saturated polyesters have a molecular weight of from about 3,000 to 50,000, preferably from about 3,000 to 25,000. The reaction between the saturated polycarboxylic acid and the polyhydric alcohol is, for example, described in unexamined Japanese Patent Publication No. 51385/1974. With a molecular weight less than 3,000, the low shrinkage effect is poor, while when the molecular weight is higher than 50,000, there is a tendency that the reaction with the monoglycidyl compound having an unsaturated group becomes difficult.

The thus obtained saturated polyester is allowed to react with a monoglycidyl compound having an unsaturated group to obtain the reaction product (A). In this reaction, the unsaturated monoglycidyl compound is used preferably in such proportion that the equivalent of unsaturation (molecular weight per one unsaturated group) is generally 2,000 to 20,000. An equivalent of unsaturation less than 2,000 is not desirable for attaining low shrinkage, and an equivalent of unsaturation higher than 20,000 is not desirable in view of strength. The unsaturated monoglycidyl compounds used include glycidyl acrylate, glycidyl methacrylate, allyl glycidyl ether, etc.

The unsaturated polyesters (B) used in the present invention include usual unsaturated polyesters, for example those obtained by reacting an unsaturated dicarboxylic acid such as maleic anhydride, fumaric acid, itaconic acid, or a mixture of the unsaturated dicarboxylic acid and a saturated dicarboxylic acid such as terephthalic acid, isophthalic acid, orthophthalic acid, succinic acid, adipic acid, etc., with a polyhydric alcohol such as ethylene glycol, diethylene glycol, propylene glycol, dipropylene glycol, hexamethylene glycol, 1,4-butylene glycol, neopentyl glycol, hydrogenated bisphenol A, bisphenol A propylene oxide addition products, etc. The reaction between the unsaturated dicarboxylic acid and the polyhydric alcohol is, for example, described in unexamined Japanese Patent Publication No. 51385/1974.

The unsaturated monomers (C) used in the present invention are any unsaturated monomers that can copolymerize with the above-mentioned reaction product (A) and the unsaturated polyester (B), and there may be mentioned for example styrene, vinyltoluene, chlorostyrene, dimethylstyrene, α-methylstyrene, divinylbenzene, diallyl phthalate, triallyl cyanurate, acrylic acid esters, methacrylic acid esters, acrylonitrile, vinyl acetate, etc. There may be used singly or as a mixture.

The ratio of the various components (A), (B) and (C) of the resin compositions according to the present invention may be suitably varied depending on the particular applications or required properties, but these components are usually used in the ratio of (A) about 1 – 20:(B) about 30 – 80: (C) about 20 – 150 parts by weight.

In curing the resin compositions of the present invention, conventional curing agents such as methyl ethyl ketone peroxide, methyl isobutyl ketone peroxide, benzoyl peroxide, cumen hydroperoxide, cyclohexanone peroxide, etc. may be used, and if necessary, curing accelerators such as organic metal salts, for example cobalt naphthenate and cobalt octenate, aliphatic amines, aromatic amines, etc. may also be used.

The present unsaturated polyester resin compositions can be effectively used for various uses as such. In combination with fillers such as calcium carbonate, siliceous sand and gravel, they may be used as resin concrete or resin mortar. Also, in combination with reinforcing materials such as glass fibers, asbestos and organic fibers, and fillers such as calcium sulfate, calcium carbonate, clay, magnesium oxide, etc., they may be used as materials for premix molding and preform or mat molding.

The present invention will be explained in more detail hereunder by way of examples. In the examples parts are by weight.

EXAMPLE 1

A mixture of 0.6 mol of adipic acid, 0.4 mol of isophthalic acid and 1.0 mol of propylene glycol was subjected to esterification reaction at 200° – 230° C. until the molecular weight reached 6,000, and thereafter the reaction mixture was mixed with 0.04 mol of glycidyl acrylate, and then allowed to react in the presence of 0.004 mol of triethylamine. The resulting product was dissolved in styrene monomer to obtain a resin solution containing a 60% resin component. This solution is referred to as Resin Solution A. Except that glycidyl methacrylate or allylglycidyl ether was used in place of glycidyl acrylate, the same procedure was carried out and the resin solutions thus obtained are referred to as Resin Solutions B and C, respectively.

On the other hand, 0.4 mol of phthalic acid anhydride, 0.6 mol of maleic 0.6 and 1.1 mols of propylene glycol were reacted at a reaction temperature of 180°–220° C. until the acid valve reached 25. After cooling, the resulting product was dissolved in styrene monomer to obtain a resin solution containing a 60% resin component. This solution is referred to as Resin Solution I.

One part of methyl ethyl ketone peroxide and 0.5 part of cobalt naphthenate were mixed with 100 parts of the unsaturated polyester resin formulations prepared by mixing each above-mentioned Resin Solution A, B and C with Resin Solution I, respectively in the ratios shown in Table 1, and then the resulting resin compositions were cured to obtain molded plates. In Table 1 are shown the physical properties of the molded plates and the physical properties of resin mortars obtained by curing each mixture of the resin compositions obtained by the same manner as described above, with 112 parts of calcium carbonate and 188 parts of an artificial lightweight aggregate "Melacite" (a product of Mitsui Metal and Mining Co.).

On the other hand, 0.6 mol of adipic acid, 0.4 mol of isophthalic acid and 1.0 mol of propylene glycol were reacted at a reaction temperature of 200°–230° C. until the molecular weight reached 6,000, to obtain a saturated polyester. To this saturated polyester, styrene monomer was added so that a resin solution (referred to as Resin Solution D) containing a 60% resin component was obtained. For comparison, the case of using a mixture of Resin Solution I and Resin Solution D, and the case of using Resin Solution I only are also shown in Table 1.

Table 1

| | | | Examples of the present invention | | | Comparative examples | |
|---|---|---|---|---|---|---|---|
| | | | A | B | C | D | |
| Resin formulation | Resin solution | | 15 parts | 15 parts | 15 parts | 15 parts | — |
| | Resin solution I | | 85 parts | 85 parts | 85 parts | 85 parts | 100 parts |
| Physical properties | Molded plates | Volumetric shrinkage (%) | 2.2 | 1.9 | 2.0 | 1.8 | 8.3 |
| | | Flexural strength (kg/cm²) | 1100 | 1150 | 1030 | 990 | 1200 |
| | Resin mortar | Linear shrinkage (%) | 0.05 | 0.03 | 0.11 | 0.04 | 0.65 |
| | | Compressive strength (kg/cm²) | 1160 | 1180 | 1120 | 810 | 1200 |

EXAMPLE 2

The same procedure as in Example 1 was carried out using 0.5 mol of sebacic acid, 0.5 mol of terephthalic acid, 0.5 mol of propylene glycol and 0.5 mol of neopentyl glycol as reaction components, to obtain a saturated polyester having a molecular weight of 6,000, which was then reacted with 0.02 mol of glycidyl methacrylate in the presence of 0.002 mol of triethylamine. The resulting product was dissolved in styrene monomer to obtain a resin solution containing a 60% resin component. This solution is referred to as Resin Solution E.

On the other hand, 0.45 mol of isophthalic acid, 0.55 mol of maleic acid, 0.8 mol of propylene glycol and 0.3 mol of neopentyl glycol were reacted in the same procedure as in Example 1 until the acid value reached 15. The resulting product was dissolved in styrene monomer to obtain a resin solution containing a 60% resin component. This solution is referred to as Resin Solution II.

To 20 parts of Resin Solution E and 100 parts of Resin Solution II, 24 parts of diallyl phthalate prepolymer, 7 parts of diallyl phthalate monomer, 1.3 parts of tertbutyl perbenzoate, 6.5 parts of zinc stearate, 350 parts of calcium carbonate and 100 parts of glass fibers were added, and the mixture was kneaded with a two-roll kneader to obtain a molding material. This material was cured under the conditions of a metallic mold temperature of 150° C., a pressure of 100 kg/cm² and a curing time of 10 minutes and the cured product was measured for molding shrinkage ratio and compressive strength in accordance with JIS K-6911.

Satisfactory results were obtained, with the molding shrinkage ratio being 0.01% and the compressive strength 20 kg/mm².

EXAMPLE 3

Mixtures of 0.8 mol of adipic acid, 0.2 mol of isophthalic acid, 0.9 mol of neopentyl glycol and 0.1 mol of propylene glycol were subjected to esterification reaction in the same way as in Example 1, to obtain saturated polyesters having a molecular weight of 1,500, 2,300, 4,800, 7,400 and 13,600, respectively. Each of the saturated polyesters was reacted with 0.03 mol of glycidyl acrylate. The resulting products were dissolved in styrene monomer respectively to obtain resin solutions containing a 60% resin component. These resin solutions are referred to as Resin Solutions F, G, H, I and J, respectively.

On the other hand, 0.55 mol of phthalic anhydride, 0.45 mol of maleic anhydride, 0.7 mol of propylene glycol and 0.4 mol of ethylene glycol were reacted in the same way as in Example 1 until the acid value reached 30. The resulting product was dissolved in styrene to obtain a resin solution containing a 60% resin component. This solution is referred to as Resin Solution III.

One part of methyl ethyl ketone peroxide and 0.5 part of cobalt naphthenate were mixed with 100 parts of the unsaturated polyester resin composition prepared by mixing the above-mentioned Resin Solutions F, G, H, I and J with Resin Solution III in the ratios shown in Table 2, and then the resulting resin compositions were cured to obtain molded plates. In Table 2 are shown the physical properties of the molded plates and the physical properties of resin mortars obtained by curing a mixture of the resin compositions obtained by the same manner as described above with 100 parts of calcium carbonate and 420 parts of siliceous sand.

Table 2

| | | | Examples of the present invention | | | Comparative examples | |
|---|---|---|---|---|---|---|---|
| | | | H | I | J | F | G |
| Resin formulation | | Resin solution | 20 parts | 20 parts | 20 parts | 20 parts | 20 parts |
| | | Resin solution III | 80 parts | 80 parts | 80 parts | 80 parts | 80 parts |
| Physical properties | Molded plates | Volumetric shrinkage (%) | 3.1 | 1.2 | 1.7 | 8.5 | 8.0 |
| | | Flexural strength (kg/cm²) | 1080 | 1020 | 980 | 1160 | 1140 |
| | Resin mortar | Linear shrinkage (%) | 0.15 | 0.02 | 0.03 | 0.51 | 0.48 |
| | | Compressive strength (kg/cm²) | 1000 | 950 | 940 | 1010 | 1020 |

REFERENCE EXAMPLE 1

A mixture of 1490 parts of isophthalic acid, 98 parts of maleic anhydride and 1410 parts of dipropylene glycol was subjected to esterification reaction in the same way as in Example 1 to obtain an unsaturated polyester having a molecular weight of 3000 and an equivalent of unsaturation of 2660. This unsaturated polyester was dissolved in styrene monomer to obtain a resin solution containing a 60% resin component. This solution is referred to as Resin Solution K.

On the other hand, 296 parts of phthalic anhydride, 784 parts of maleic anhydride, 371 parts of ethylene glycol and 320 parts of propylene glycol were reacted in the same way as in Example 1 to obtain an unsaturated polyester having a molecular weight of 1800 and an equivalent of unsaturation of 200. This unsaturated polyester was dissolved in styrene monomer to obtain a resin solution containing a 70% resin component. This solution is referred to as Resin Solution IV.

A mixture of 20 parts of Resin Solution K, 80 parts of Resin Solution IV, 100 parts of calcium carbonate, 420 parts of siliceous sand, 1.0 part of methyl ethyl ketone peroxide and 0.5 part of cobalt naphthenate was cured to obtain a resin mortar. The linear shrinkage ratio and the compressive strength of this resin mortar were 0.53% and 1070 kg/cm², respectively, and thus satisfactory results were not obtained.

What we claim is:

1. An unsaturated polyester resin composition which comprises (A) a reaction product between (1) a saturated polyester having a molecular weight of about 3,000 – 50,000 obtained from a saturated polycarboxylic acid and a polyhydric alcohol and (2) an unsaturated monoglycidyl compound, (B) an unsaturated polyester, and (C) an unsaturated monomer copolymerizable with the reaction product (A) and the unsaturated polyester (B).

2. A composition as claimed in claim 1 wherein the saturated polycarboxylic acid is selected from the group consisting of isophthalic acid, phthalic anhydride, terephthalic acid, succinic acid, adipic acid and sebacic acid.

3. A composition as claimed in claim 1 wherein the polyhydric alcohol is selected from the group consisting of ethylene glycol, diethylene glycol, triethylene glycol, propylene glycol, dipropylene glycol, 1,3-butylene glycol, neopentyl glycol, hydrogenated bisphenol A and bisphenol A propylene oxide addition products.

4. A composition as claimed in claim 1 wherein the saturated polyester has a molecular weight of from 3000 to 50000.

5. A composition as claimed in claim 1 wherein the unsaturated monoglycidyl compound is selected from the group consisting of acrylic acid glycidyl ester, methacrylic acid glycidyl ester and allyl glycidyl ether.

6. A composition as claimed in claim 1 wherein the unsaturated monoglycidyl compound is reacted with the saturated polyester in such proportion that the equivalent of unsaturation is 2000 to 20000.

7. A composition as claimed in claim 1 wherein the unsaturated monomer is selected from the group consisting of styrene, vinyltoluene, chlorostyrene, divinylbenzene, diallyl phthalate, triallyl cyanurate, acrylic acid esters and methacrylic acid esters.

8. A composition as claimed in claim 1 wherein the proportions of the components (A), (B) and (C) are (A) 1 – 20, (b) 30–80 and (C) 20 – 150 parts by weight.

9. A composition as claimed in claim 1 wherein the unsaturated polyester is selected from those obtained by reacting an unsaturated dicarboxylic acid, or a mixture of an unsaturated dicarboxylic acid and a saturated dicarboxylic acid, with a polyhydric alcohol.

10. A composition as claimed in claim 9 wherein the unsaturated dicarboxylic acid is maleic anhydride, fumaric acid or itaconic acid, the saturated dicarboxylic acid is terephthalic acid, isophthalic acid, orthophthalic acid, succinic acid or adipic acid, and the polyhydric alcohol employed in obtaining the unsaturated polyester is ethylene glycol, diethylene glycol, propylene glycol, dipropylene glycol, hexamethylene glycol, 1,4-butylene glycol, neopentyl glycol, hydrogenated bisphenol A or a bisphenol A propylene oxide addition product.

11. A resin concrete or mortar comprising the composition as claimed in claim 1 and a filler.

12. A material for premix molding, preform molding or mat molding comprising the composition as claimed in claim 1, a reinforcing material and a filler.

13. An article molded by using the composition as claimed in claim 1.

* * * * *